United States Patent [19]
Oohara et al.

[11] Patent Number: 6,104,150
[45] Date of Patent: Aug. 15, 2000

[54] MOTOR DRIVING CIRCUIT

[75] Inventors: Tomomitsu Oohara; Yukihiro Terada, both of Atsugi, Japan

[73] Assignee: Mitsumi Electric Co., Ltd., Tokyo, Japan

[21] Appl. No.: 09/046,825

[22] Filed: Mar. 24, 1998

[30] Foreign Application Priority Data

Mar. 31, 1997 [JP] Japan .................................. 9-080982

[51] Int. Cl.[7] ................................ H02P 7/06; H02P 8/00
[52] U.S. Cl. ......................... 318/254; 318/138; 318/490; 324/503
[58] Field of Search ..................................... 318/800, 811, 318/806, 769, 814, 490, 798, 778, 138, 439; 324/522, 104, 54, 503, 510; 361/76, 82, 42, 90; 363/21, 132

[56] References Cited

U.S. PATENT DOCUMENTS

| | | | |
|---|---|---|---|
| 4,488,101 | 12/1984 | Studtmann | 318/800 |
| 4,540,922 | 9/1985 | Horvath et al. | 318/490 |
| 4,716,487 | 12/1987 | Horvath et al. | 361/42 |
| 5,258,695 | 11/1993 | Utenick et al. | 318/138 |
| 5,686,839 | 11/1997 | Takagi | 324/503 |
| 5,748,459 | 5/1998 | Yamada et al. | 363/21 |
| 5,751,132 | 5/1998 | Horvath et al. | 318/798 |
| 5,880,572 | 3/1999 | Tajima et al. | 318/800 |

OTHER PUBLICATIONS

A book, 'Precision Small Motor Application Method', supervised by Hiroshi Yamada, edited by the Industrial Investigation Society (Kogo Chosa Kai), and published by Kaoru Yoshimoto, the first edition of which was published on Jul. 30, 1986; pp. 51–53, 'Axial Flux Type Brushless Motor', 'Sheet Coil' (1) Structure; pp. 201–203, 'Axial Flux Type Brushless Motor', 'Sheet Coil Motor'; and pp. 225–227, 'Features and Specification of Used Scanner Motor', 'Speed Control of Scanner Motor'.

*Primary Examiner*—Paul Ip
*Attorney, Agent, or Firm*—Ladas & Parry

[57] ABSTRACT

A motor driving circuit controls driving currents to be supplied to stator coils of a plurality of phases so as to supply the driving currents to the stator coils in sequence so as to generate a rotating magnetic field. The interaction between the rotating magnetic field generated by the stator coils and a magnetic field generated by a magnet of a rotor causes the rotor to rotate with respect to the stator coils. The motor driving circuit includes a driving circuit for supplying the driving currents to the stator coils, respectively; and a preventing circuit for preventing the driving means from supplying the driving currents to the stator coils in sequence.

4 Claims, 6 Drawing Sheets

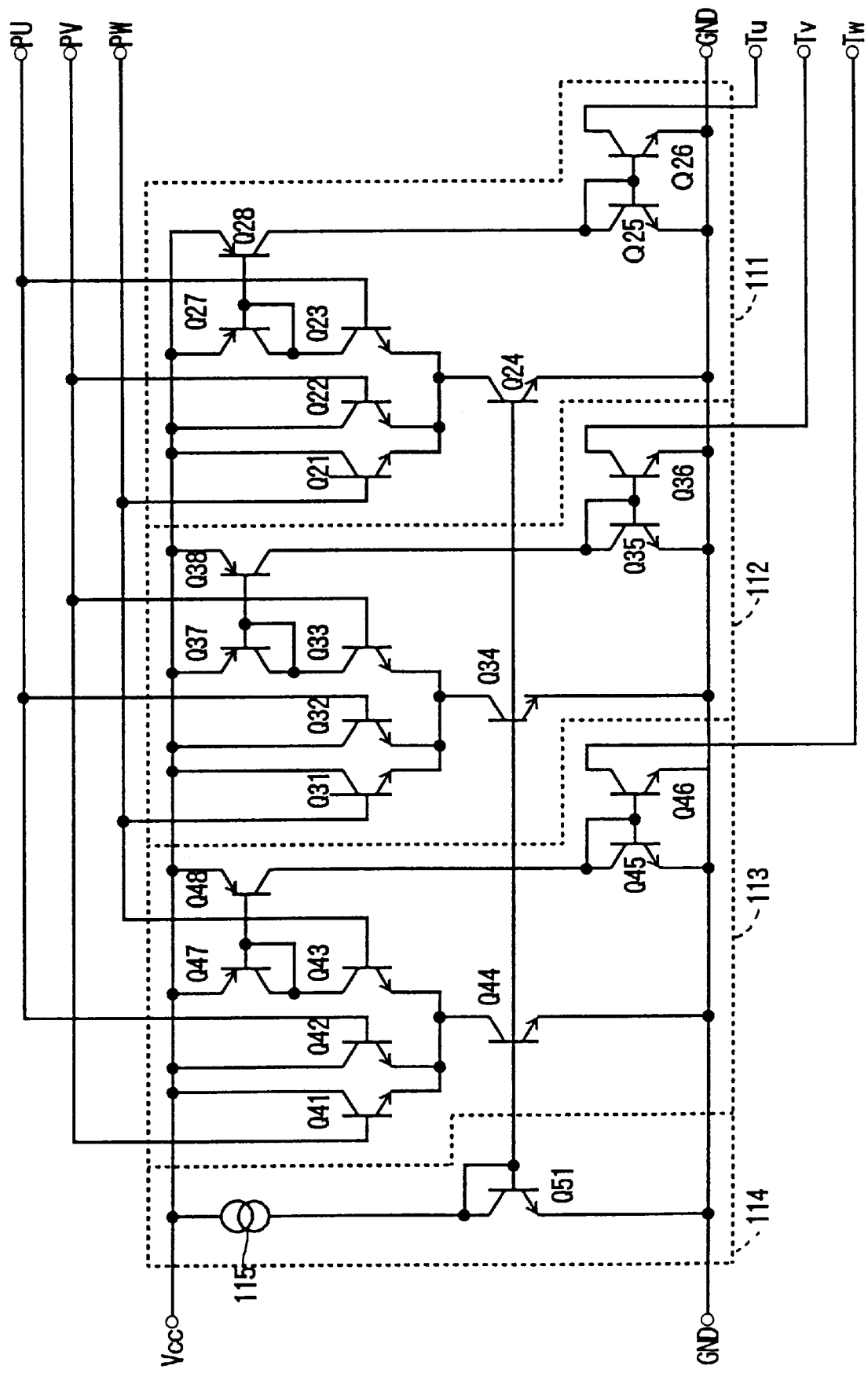

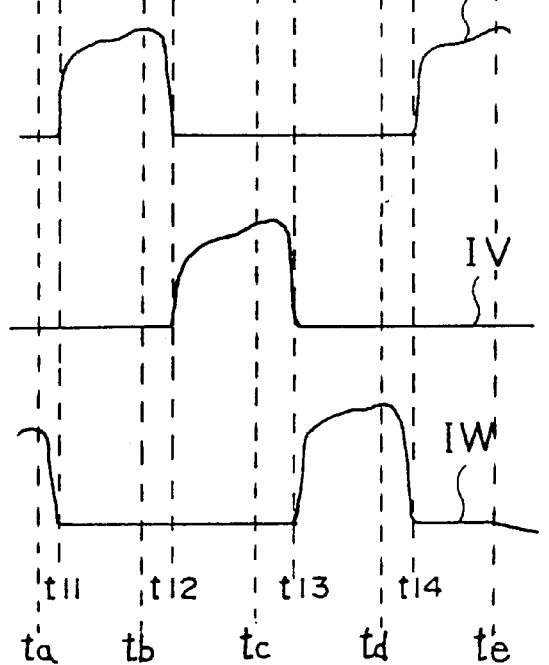

MOTOR DRIVING CIRCUIT

BACKGROUND OF THE INVENTION

1. Field of the Invention

The present invention relates to a motor driving circuit, and, in particular, to a motor driving circuit for driving a brushless motor.

2. Description of the Prior Art

FIG. 1 shows a block diagram of one example of a motor driving circuit in the prior art.

The motor driving circuit 1 in the prior art drives a three-phase brushless motor 2. The motor driving circuit 1 includes a driving signal generating circuit 3 which detects a rotational position of the motor 2 as rotational position signals in accordance with the rotational position of the motor 2, and generates driving signals in accordance with the detected rotational position. The motor driving circuit 1 further includes a pre-driving circuit 4. The driving signals generated by the diving signal generating circuit 3 are provided to the pre-driving circuit 4, and the pre-driving circuit 4 generates pre-driving currents in accordance with the driving signals. The motor diving circuit 1 further includes output transistors Q1, Q2 and Q3 which are turned on and turned off by the pre-driving currents supplied by the pre-driving circuit 4, and, thus, supply currents to the motor 2. The motor driving circuit 1 further includes resistors R1, R2 and R3 which are connected with the bases of the output transistors Q1, Q2 and Q3, and absorb the leakage currents which otherwise flow to the bases of the output transistors Q1, Q2 and Q3.

The three-phase brushless motor 2 includes a stator coil portion 11 which generates a rotating magnetic field extending in the rotation axis directions (arrow A directions), and a rotor 12 which faces the stator coil portion 11, is rotatably set, includes a magnet magnetized in the rotation axis directions (arrow A directions) to have multiple poles, and is rotated as a result of being affected by the rotational magnetic field generated by the stator coil portion 11. (The basic technology of such a three-phase brushless motor is the same as that of motors disclosed in a book 'Precision Small Motor Application Method', supervised by Hiroshi Yamada, edited by the Industrial Investigation Society (Kogyo Chosa Kai), and published by Kaoru Yoshimoto, the first edition of which was published on Jul. 30, 1986. In particular, for example, see pages 51–53, 'Axial Flux Type Brushless Motor', 'Sheet Coil' (1) Structure, pages 201–203, 'Axial Flux Type Brushless Motor', 'Sheet Coil Motor' and pages 225–257, 'Features and Specification of Used Scanner Motor', 'Speed Control of Scanner Motor'.)

The stator coil portion 11 includes a U-phase coil 21, a V-phase coil 22 and a W-phase coil 23, one end of each of the U-phase coil 21, V-phase coil 22 and W-phase coil 23 being connected with the power source voltage Vcc.

FIG. 2 shows a circuit diagram of the pre-driving circuit 4 of the example of the motor driving circuit of the prior art.

The pre-driving circuit 4 includes a current source 31 and transistors Q11, Q12 and Q13. One end of the current source 31 is connected with a power source voltage Vcc, and the other end of the current source 31 is connected with the emitters of the transistors Q11, Q12 and Q13. Using the power source voltage Vcc, the current source 31 generates and supplies the driving currents, in accordance with the load of the motor 2, to the emitters of the transistors Q11, Q12 and Q13.

The transistors Q11, Q12 and Q13 are PNP transistors, the emitters thereof being connected with the power source voltage Vcc, the collectors thereof being connected with the bases of transistors Q1, Q2 and Q3 through a current amplifier 32, the bases thereof having the driving signals PU, PV and PW supplied thereto by the driving signal generating circuit 3.

The transistor Q11 is a transistor which generates the pre-driving current IPU for U-phase driving, the base thereof having the U-phase driving signal PU supplied thereto from the driving signal generating circuit 3, is turned off and turned on in accordance with the U-phase driving signal PU, and thus controls the pre-driving current IPU to be supplied to the base of the transistor Q1. When the voltage of the U-phase driving signal PU is higher than a predetermined voltage, the transistor Q11 is turned off, thus stopping supply of the pre-driving current IPU to the base of the transistor Q1. When the voltage of the U-phase driving signal PU is lower than the predetermined voltage, the transistor Q11 is turned on, thus supplying the pre-driving current IPU to the base of the transistor Q1.

The transistor Q12 is a transistor which generates the pre-driving current IPV for V-phase driving, the base thereof having the V-phase driving signal PV supplied thereto from the driving signal generating circuit 3, is turned off and turned on in accordance with the V-phase driving signal PV, and thus controls the pre-driving current IPV to be supplied to the base of the transistor Q2. When the voltage of the V-phase driving signal PV is higher than a predetermined voltage, the transistor Q12 is turned off, thus stopping supply of the pre-driving current IPV to the base of the transistor Q2. When the voltage of the V-phase driving signal PV is lower than the predetermined voltage, the transistor Q12 is turned on, thus supplying the pre-driving current IPV to the base of the transistor Q2.

The transistor Q13 is a transistor which generates the pre-driving current IPW for W-phase driving, the base thereof having the W-phase driving signal PW supplied thereto from the driving signal generating circuit 3, is turned off and turned on in accordance with the W-phase driving signal PW, and thus controls the pre-driving current IPW to be supplied to the base of the transistor Q3. When the voltage of the W-phase driving signal PW is higher than a predetermined voltage, the transistor Q13 is turned off, thus stopping supply of the pre-driving current IPW to the base of the transistor Q3. When the voltage of the W-phase driving signal PW is lower than the predetermined voltage, the transistor Q13 is turned on, thus supplying the pre-driving current IPW to the base of the transistor Q3.

The transistors Q1, Q2 and Q3 are NPN transistors, the collectors thereof being connected with the other ends of the U-phase, V-phase and W-phase coils 21, 22 and 23, and the emitters thereof being grounded. The pre-driving circuit 4 supplies the pre-driving currents IPU, IPV and IPW to the bases of the transistors Q1, Q2 and Q3. The transistors Q1, Q2 and Q3 control, in accordance with the pre-driving currents IPU, IPV and IPW supplied from the pre-driving circuit 4, the driving currents IU, IV and IW to be supplied to the U-phase, V-phase and W-phase coils 21, 22 and 23 from the power source voltage Vcc.

The transistor Q1 controls the driving current IU supplied to the U-phase coil 21. When the pre-driving current IPU is supplied to the base of the transistor Q1, the transistor Q1 is turned on, forms a path from the power source voltage Vcc to the ground GND, and supplies the driving current IU to the U-phase coil 21. When the supply of the pre-driving current IPU from the pre-driving circuit 4 to the base of the transistor Q1 is stopped, the transistor Q1 is turned off, cuts the path from the power source voltage Vcc to the ground GND, and stops the supply of the driving current IU to the U-phase coil 21.

The transistor Q2 controls the driving current IV supplied to the V-phase coil 22. When the pre-driving current IPV is supplied to the base of the transistor Q2, the transistor Q2 is turned on, forms a path from the power source voltage Vcc to the ground GND, and supplies the driving current IV to the V-phase coil 22. When the supply of the pre-driving current IPV from the pre-driving circuit 4 to the base of the transistor Q2 is stopped, the transistor Q2 is turned off, cuts the path from the power source voltage Vcc to the ground GND, and stops the supply of the driving current IV to the V-phase coil 22.

The transistor Q3 controls the driving current IW supplied to the W-phase coil 23. When the pre-driving current IPW is supplied to the base of the transistor Q3, the transistor Q3 is turned on, forms a path from the power source voltage Vcc to the ground GND, and supplies the driving current IW to the W-phase coil 23. When the supply of the pre-driving current IPW from the pre-driving circuit 4 to the base of the transistor Q3 is stopped, the transistor Q3 is turned off, cuts the path from the power source voltage Vcc to the ground GND, and stops the supply of the driving current IW to the W-phase coil 23.

FIGS. 3A, 3B, 3C and 3D show operation waveforms of the example of the motor driving circuit in the prior art. FIG. 3A shows the waveforms of the driving signals PU, PV and PW generated by the driving signal generating circuit 3. FIG. 3B shows the waveform of the driving current IU supplied to the U-phase coil 21. FIG. 3C shows the waveform of the driving current IV supplied to the V-phase coil 22. FIG. 3D shows the waveform of the driving current IW supplied to the W-phase coil 23.

First, the voltages of the driving signals PV and PW supplied from the driving signal generating circuit 3 to the pre-driving circuit 4 increase and the voltage of the driving signal PU decreases. From the time t1, as shown in FIG. 3A, the voltage of the driving signal PU is lower than the voltages of the driving signals PV and PW. Thereby, in the pre-driving circuit 4, the transistor Q11, to which the driving signal PU is supplied, is turned on, and the transistors Q12 and Q13, to which the driving signals PV and PW are supplied, are turned off.

When the transistor Q11 is turned on, the pre-driving current IPU is supplied to the base of the transistor Q1, and thereby, the transistor Q1 is turned on. On the other hand, because the transistors Q12 and Q13 are turned off, the pre-driving currents IPV and IPW are not supplied to the transistors Q2 and Q3. As a result, the transistors Q2 and Q3 are turned off.

When the transistor Q1 is turned on and the transistors Q2 and Q3 are turned off, the other end of the U-phase coil 21 is connected to the ground GND, and, as shown in FIG. 3B, the driving current IU flows through the U-phase coil 21. When the driving current IU flows through the U-phase coil 21, the magnetic field is generated, and thereby, the rotor 12 is rotated by the interaction between the magnetic field generated by the U-phase coil 21 and the magnetic fields generated by the corresponding portion of the magnet of the rotor 12.

Then, the voltage of the driving signal PU increases and the voltage of the driving signal PV decreases. When the voltage of the driving signal PU is higher than the voltage of the driving signal PV from the time t2, as shown in FIG. 3A, the transistor Q11, to the base of which the driving signal PU is supplied, is turned off, and the transistor Q12, to the base of which the driving signal PV is supplied, is turned on, in the pre-driving circuit 4. When the transistor Q11 is turned off, the supply of the pre-driving current IPU to the transistor Q1 is stopped, and thereby the transistor Q1 is turned off. When the transistor Q1 is turned off, the supply of the driving current IU to the U-phase coil 21 is stopped.

Further, when the transistor Q12 is turned on, the pre-driving current IPV is supplied to the base of the transistor Q2, and thereby, the transistor Q2 is turned on. When the transistor Q2 is turned on, the other end of the V-phase coil 22 is grounded, and thereby, as shown in FIG. 3C, the driving current IV is supplied to the V-phase coil 22. As a result, the rotor 12 is rotated by the interaction between the magnetic field generated by the V-phase coil 22 and the magnetic field generated by the corresponding portion of the magnet of the rotor 12.

Then, the voltage of the driving signal PV increases and the voltage of the driving signal PW decreases. When the voltage of the driving signal PV is higher than the voltage of the driving signal PW from the time t3, as shown in FIG. 3A, the transistor Q12, to the base of which the driving signal PV is supplied, is turned off, and the transistor Q13, to the base of which the driving signal PW is supplied, is turned on, in the pre-driving circuit 4. When the transistor Q12 is turned off, the supply of the pre-driving current IPV to the transistor Q2 is stopped, and thereby the transistor Q2 is turned off. When the transistor Q2 is turned off, the supply of the driving current IV to the V-phase coil 22 is stopped.

Further, when the transistor Q13 is turned on, the pre-driving current IPW is supplied to the base of the transistor Q3, and thereby, the transistor Q3 is turned on. When the transistor Q3 is turned on, the other end of the W-phase coil 23 is grounded, and thereby, as shown in FIG. 3D, the driving current IW is supplied to the W-phase coil 23. As a result, the rotor 12 is rotated by the interaction between the magnetic field generated by the W-phase coil 23 and the magnetic field generated by the corresponding portion of the magnet of the rotor 12.

Thus, a rotating magnetic field is generated in the stator coil portion 11, from the U phase to the V phase, to the W phase, to the U phase, . . . The interaction between the rotating magnetic field and the magnetic field of the magnet of the rotor 12 causes the rotor 12 to rotate.

That is, the transistors Q1, Q2 and Q3 are alternately turned on for each ⅓ period at the hatched portions of the driving signals PU, PV and PW shown in FIG. 3A. When the voltage of the driving signal PU is compared with the voltages of the driving signals PV, PW during the period in which the driving current IU does not flow through the U-phase coil 21, and when the voltage difference between the voltage of the driving signal PU and the voltage of the driving signals PV, PW is a minimum one, for example, when the voltage difference is 80 mV, the ratio of the collector currents of the transistors Q11, Q12 and Q13 is (1/20) :1:1.

The driving signal generating circuit 3 generates the driving signals having a fixed amplitude without regard to the load of the motor 2. However, as the load of the motor 2 increases, the driving currents IU, IV and IW increase. The collector currents of the transistors Q11, Q12 and Q13 are set so that each of the collector currents of two of the transistors Q11, Q12 and Q13 which are in their turned off states is 1/20 the collector current of the other one of the transistors Q11, Q12 and Q13. When the driving currents increase in the same ratio, the collector currents of two of the transistors Q11, Q12 and Q13 which should be in their turned off states also increase. Thereby, the base currents are supplied to the two of the transistors Q1, Q2 and Q3 which should be in their turned off states. Thereby, the two of the transistors Q1, Q2 and Q3 which should be in their turned off states are turned on. Thereby, leakage currents flow through the two of the coils 21, 22 and 23 corresponding to the two of the transistors Q1, Q2 and Q3 which should be in their turned off states. Thus, in the time period in which one of the coils 21, 22 and 23 should drive the rotor 12, currents also flow through the other two of the coils 21, 22 and 23. Thereby, an unnecessary magnetic field is generated, and the driving efficiency of the motor 2 is degraded.

In order to prevent generation of such leakage currents of the transistors Q1, Q2 and Q3, resistors R1, R2 and R3 for absorbing the leakage currents are provided between the bases of the transistors Q1, Q2, Q3 and the ground GND. By providing the resistors R1, R2 and R3 between the bases of the transistors Q1, Q2, Q3 and the ground GND, even when the leakage currents are supplied to the collectors of two of the transistors Q11, Q12 and Q13 which should be in their turned off states, the currents flow through the corresponding two of the resistors R1, R2 and R3 to the ground GND. Thereby, increase of the base voltages of the corresponding two of the transistors Q1, Q2 and Q3 due to the leakage currents can be controlled, and the corresponding two of the transistors Q1, Q2 and Q3 are prevented from being turned on.

However, in the motor driving circuit in the prior art, the resistors R1, R2 and R3 are provided between the bases of the transistors Q1, Q2, Q3 and the ground GND so that the leakage currents flow into the ground GND through the two of the resistors R1, R2 and R3. Thereby, when the load of the motor increases and the leakage currents flowing from the bases of the two of the transistors Q11, Q12 and Q13 to the collectors thereof increase, the voltages appearing across the two of the resistors R1, R2 and R3 increase. When the increase of the leakage currents cause the voltages appearing across the two of the resistors R1, R2 and R3 to reach the voltage by which the transistors Q1, Q2 and Q3 are turned on, the corresponding two of the transistors Q1, Q2 and Q3 are turned on. Thereby, as indicated by broken lines in FIGS. 3B, 3C and 3D, the leakage currents flow through the corresponding two of the coils 21, 22 and 23. Thereby the driving efficiency is degraded.

It may be attempted to absorb the leakage current sufficiently by using resisters R1, R2 and R3 having smaller resistances. However, by using the resistors R1, R2 and R3 having smaller resistances, the voltage by which the transistors Q1, Q2 and Q3 are turned on decreases. Therefore, it is necessary to increase the driving currents, and thereby, ineffective currents increase.

SUMMARY OF THE INVENTION

The present invention has been devised in consideration of the above-mentioned points. An object of the present invention is to provide a motor driving circuit in which the motor driving efficiency can be improved as a result of the leakage current being surely absorbed and the consumed currents can be reduced.

A motor driving circuit, according to the present invention, comprises:

a plurality of transistors for switching supply of driving currents to coils of a plurality of phases in sequence so as to cause the coils to generate a rotating magnetic field;

a driving signal generating circuit for supplying a plurality of driving signals, in accordance with the rotational position of a rotor magnet which is provided rotatably and faces the coils, to a pre-driving circuit;

the pre-driving circuit switching the plurality of transistors by supplying a plurality of pre-driving currents to the bases of the plurality of transistors, respectively, in accordance with the plurality of driving signals, so as to cause the coils to generate the rotating magnetic field; and a leakage absorbing circuit for detecting a plurality of time periods during which the plurality of transistors should be in their turned off states, respectively, and turning off the plurality of transistors during the plurality of time periods, respectively.

In this arrangement, the leakage absorbing circuit detects a plurality of time periods during which the plurality of transistors should be in their turned off states, respectively, and turns off the plurality of transistors during the plurality of time periods, respectively. Thereby, it is possible to cause the transistor to be in its turned off state during the time period during which the transistor should be in its turned off state. As a result, leakage currents are prevented from flowing through the coils, respectively. Thereby, ineffective currents can be reduced, the motor driving efficiency can be improved and the consumed currents can be reduced.

The leakage absorbing circuit may comprise:

a comparing circuit, provided for each of the plurality of transistors, for comparing the level of the driving signal of the plurality of driving signals for the transistor of the comparing circuit with the levels of the driving signals of the plurality of driving signals for the other transistors; and a turning off circuit for turning off the transistor of the comparing circuit during the time period starting when the level of the driving signal of the plurality of driving signals for the transistor is higher than any of the levels of the other driving signals of the plurality of driving signals, and ending when the level of the driving signal of the plurality of driving signals for the transistor is lower than any of the levels of the other driving signals of the plurality of driving signals.

Other objects and further features of the present invention will become more apparent from the following detailed description when read in conjunction with the accompanying drawings.

BRIEF DESCRIPTION OF THE DRAWINGS

FIG. 5 shows a circuit diagram of a leakage absorbing circuit of the motor driving circuit in the embodiment of the present invention; and FIGS. 6A, 6B, 6C, 6D, 6E, 6F and 6G show operation waveforms of the motor driving circuit in the embodiment of the present invention.

DETAILED DESCRIPTION OF THE PREFERRED EMBODIMENT

Figure 4:
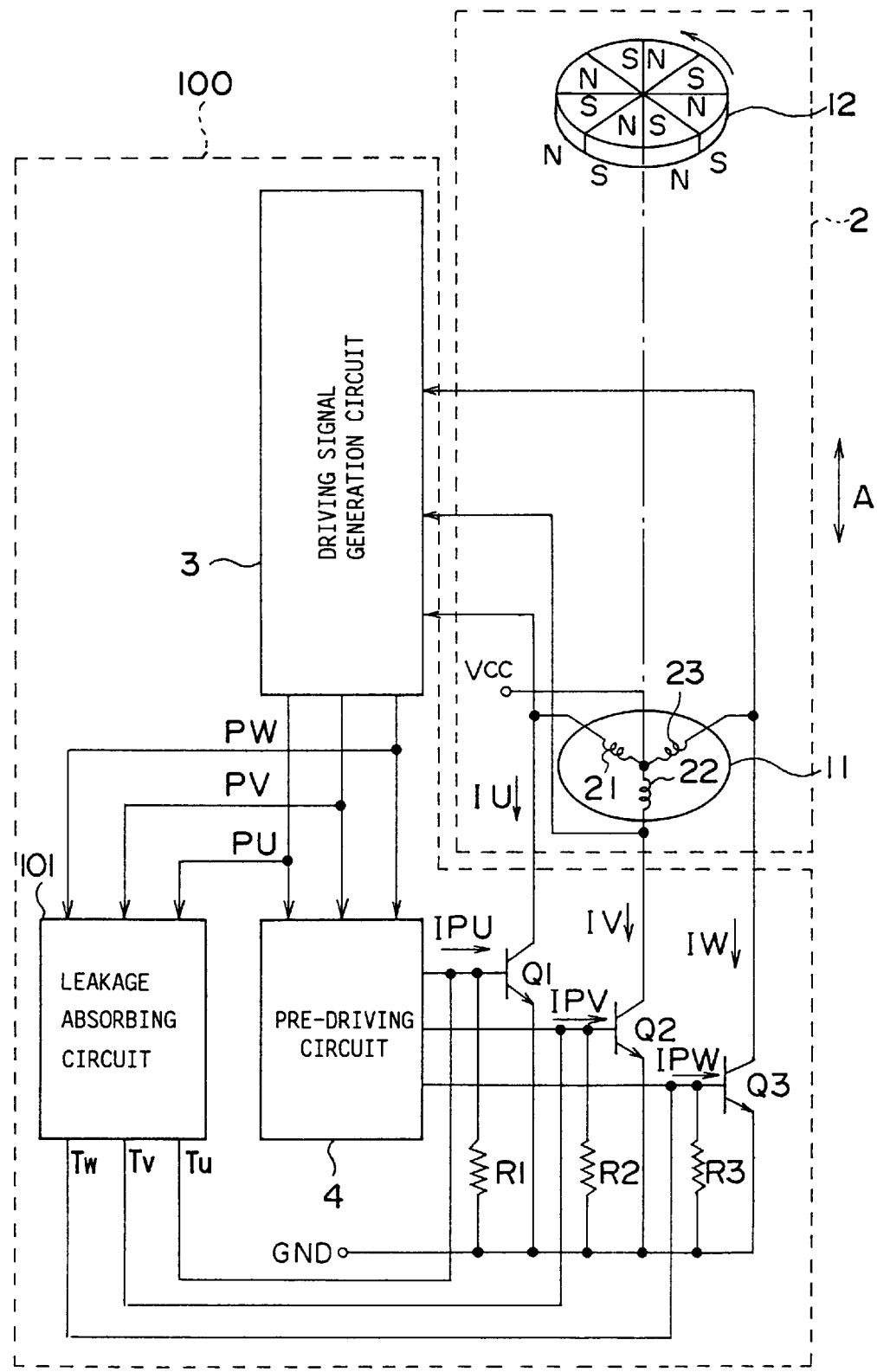
FIG. 4 shows a block diagram of a motor driving circuit in one embodiment of a motor driving circuit according to the present invention.

FIG. 4 shows a block diagram of one embodiment of a motor driving circuit of the present invention. The same reference numerals are given to units/parts/components the same as those of FIG. 1, and the descriptions thereof will be omitted.

Figure 1:
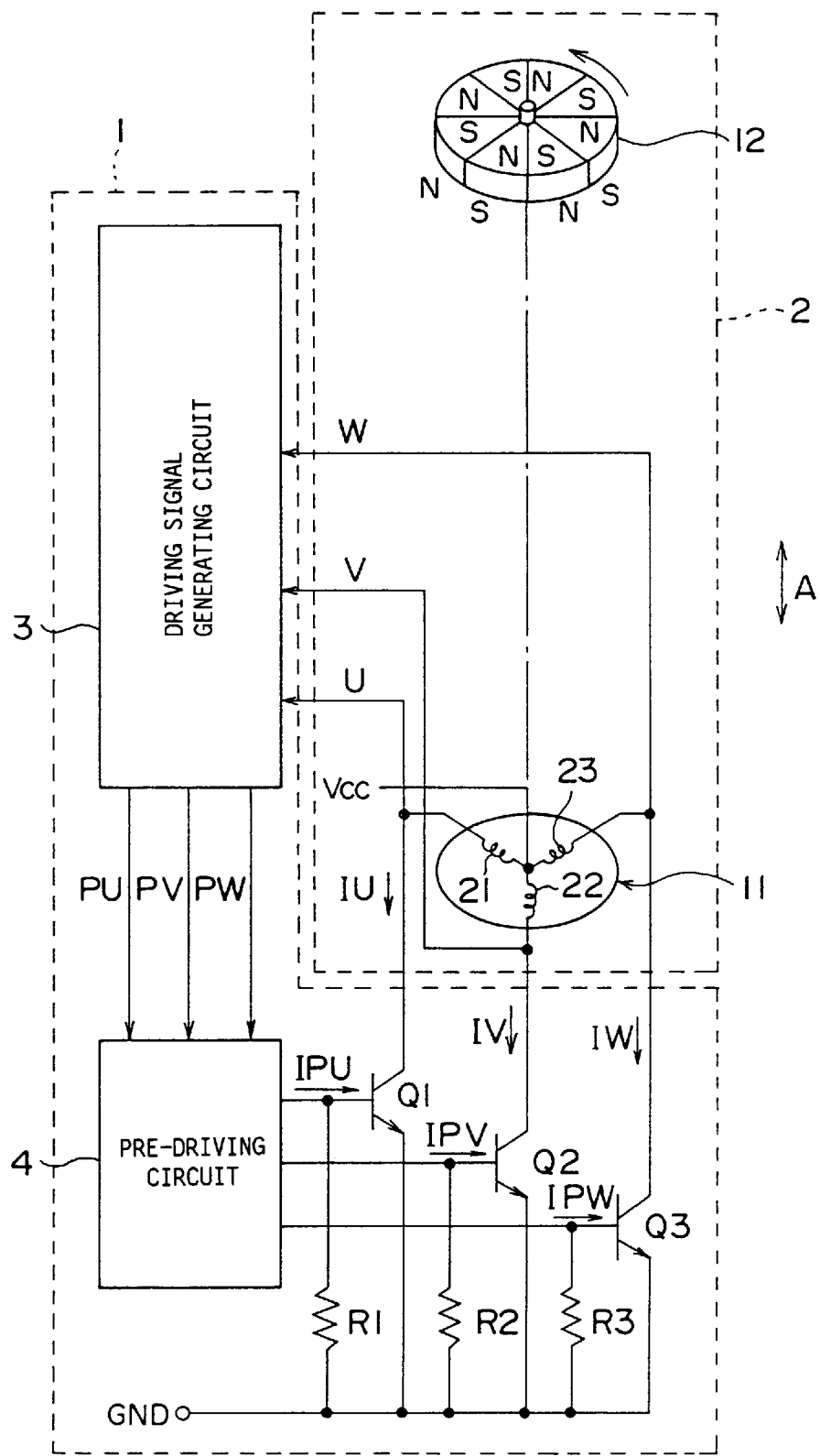
FIG. 1 shows a block diagram of a motor driving circuit in the prior art.

The motor driving circuit 100 in the embodiment is obtained from adding, to the motor driving circuit 1 shown in FIG. 1, a leakage absorbing circuit 101 for absorbing the leakage currents of the transistors Q1, Q2 and Q3.

The leakage absorbing circuit 101 has the driving signals PU, PV and PW supplied thereto. Based on the driving signals supplied from the driving signal generating circuit 3, the leakage absorbing circuit 101 detects the time periods during which the respective transistors Q1, Q2 and Q3 should be turned off, respectively, and the bases of the transistors Q1, Q2 and Q3 are grounded so that the transistors Q1, Q2 and Q3 are surely turned off during the detected time periods, respectively. Thus, supply of the leakage currents to the U-phase coil 21, V-phase coil 22 and W-phase coil 23 during the corresponding time periods, during which the transistors Q1, Q2 and Q3 should be in their turned off states, respectively, is prevented.

FIG. 5 shows a circuit arrangement of the leakage absorbing circuit of the embodiment of the motor driving circuit of the present invention.

The leakage absorbing circuit 101 includes a U-phase leakage current absorbing circuit 111, a V-phase leakage current absorbing circuit 112, a W-phase leakage current absorbing circuit 113, and a constant current circuit 114 which supplies driving currents to the U-phase leakage current absorbing circuit 111, V-phase leakage current absorbing circuit 112 and W-phase leakage current absorbing circuit 113.

The U-phase leakage current absorbing circuit 111 includes NPN transistors Q21 through Q26 and PNP transistors Q27 and Q28.

The driving signals PV and PW are supplied from the driving signal generating circuit 3 to the bases of the transistors Q22 and Q21, respectively, and the driving signal PU is supplied to the base of the transistor Q23 from the driving signal generating circuit 3. The emitters of the transistors Q21 through Q23 are connected with the collector of the transistor Q24 which forms a constant current circuit together with the constant current circuit 114. The base of the transistor Q24 is connected with the constant current circuit 114 and the emitter thereof is grounded. As a result, the transistor Q24 draws the constant current, set by the constant current circuit 114, from the collector side thereof.

The collector of the transistor Q23 is connected with the base and collector of the transistor Q27 and also with the base of the transistor Q28. The power source voltage Vcc is connected with the emitters of the transistors Q27 and Q28. When the transistor Q23 is turned on, the transistors Q27 and Q28 are turned on. When the transistor Q23 is turned off, the transistors Q27 and Q28 are turned off. The collector of the transistor Q28 is connected with the collector and base of the transistor Q25 and also with the base of the transistor Q26.

When the transistor Q28 is turned on, the current is supplied from the collector of the transistor Q28 to the bases of the transistors Q25 and Q26. Thereby, the transistors Q25 and Q26 are turned on. When the transistor Q26 is turned on, a terminal Tu connected with the base of the transistor Q1 is grounded.

When the transistor Q26 is turned on and the base of the transistor Q1 is grounded, the transistor Q1 is surely turned off. Thereby, the leakage current is prevented from flowing through the U-phase coil 21.

The V-phase leakage current absorbing circuit 112 includes NPN transistors Q31 through Q36 and PNP transistors Q37 and Q38.

The driving signals PU and PW are supplied from the driving signal generating circuit 3 to the bases of the transistors Q32 and Q31, respectively, and the driving signal PV is supplied to the base of the transistor Q33 from the driving signal generating circuit 3. The emitters of the transistors Q31 through Q33 are connected with the collector of the transistor Q34 which forms a constant current circuit together with the constant current circuit 114. The base of the transistor Q34 is connected with the constant current circuit 114 and the emitter thereof is grounded. As a result, the transistor Q34 draws the constant current, set by the constant current circuit 114, from the collector side thereof.

The collector of the transistor Q33 is connected with the base and collector of the transistor Q37 and also with the base of the transistor Q38. The power source voltage Vcc is connected with the emitters of the transistors Q37 and Q38. When the transistor Q33 is turned on, the transistors Q37 and Q38 are turned on. When the transistor Q33 is turned off, the transistors Q37 and Q38 are turned off. The collector of the transistor Q38 is connected with the collector and base of the transistor Q35 and also with the base of the transistor Q36.

When the transistor Q38 is turned on, the current is supplied from the collector of the transistor Q38 to the bases of the transistors Q35 and Q36. Thereby, the transistors Q35 and Q36 are turned on. When the transistor Q36 is turned on, a terminal Tv connected with the base of the transistor Q2 is grounded.

When the transistor Q36 is turned on and the base of the transistor Q2 is grounded, the transistor Q2 is surely turned off. Thereby, the leakage current is prevented from flowing through the V-phase coil 22.

The W-phase leakage current absorbing circuit 113 includes NPN transistors Q41 through Q46 and PNP transistors Q47 and Q48.

The driving signals PU and PV are supplied from the driving signal generating circuit 3 to the bases of the transistors Q42 and Q41, respectively, and the driving signal PW is supplied to the base of the transistor Q43 from the driving signal generating circuit 3. The emitters of the transistors Q41 through Q43 are connected with the collector of the transistor Q44 which forms a constant current circuit together with the constant current circuit 114. The base of the transistor Q44 is connected with the constant current circuit 114 and the emitter thereof is grounded. As a result, the transistor Q44 draws the constant current, set by the constant current circuit 114, from the collector side thereof.

The collector of the transistor Q43 is connected with the base and collector of the transistor Q47 and also with the base of the transistor Q48. The power source voltage Vcc is connected with the emitters of the transistors Q47 and Q48. When the transistor Q43 is turned on, the transistors Q47 and Q48 are turned on. When the transistor Q43 is turned off, the transistors Q47 and Q48 are turned off. The collector of the transistor Q48 is connected with the collector and base of the transistor Q45 and also with the base of the transistor Q46.

When the transistor Q48 is turned on, the current is supplied from the collector of the transistor Q48 to the bases of the transistors Q45 and Q46. Thereby, the transistors Q45 and Q46 are turned on. When the transistor Q46 is turned on, a terminal Tw connected with the base of the transistor Q3 is grounded.

When the transistor Q46 is turned on and the base of the transistor Q3 is grounded, the transistor Q3 is surely turned off. Thereby, the leakage current is prevented from flowing through the W-phase coil 23.

The constant current circuit 114 includes a constant current source 115 and an NPN transistor Q51, and causes the constant currents to flow in the U-phase leakage current absorbing circuit 111, V-phase leakage current absorbing circuit 112 and W-phase leakage current absorbing circuit 113, respectively. One end of the constant current source 115 is connected with the power source voltage Vcc and the other end of the constant current source is connected with the collector and base of the transistor Q51.

The base of the transistor Q51 is connected with the bases of the transistors Q24, Q34 and Q44, which are used to supply the constant currents, in the U-phase leakage current absorbing circuit 111, V-phase leakage current absorbing circuit 112 and W-phase leakage current absorbing circuit 113. The emitter of the transistor Q51 is grounded. Because the voltage $V_{BE}$ between the base and emitter of the transistor Q51 is fixed, the base voltages of the transistors Q24, Q34 and Q44, which are used to supply the constant currents, in the U-phase leakage current absorbing circuit 111, V-phase leakage current absorbing circuit 112 and W-phase leakage current absorbing circuit 113, are maintained to be fixed. Thereby, the currents drawn from the collectors of the transistors Q24, Q34 and Q44, which are used to supply the constant currents, are fixed.

Operations of the embodiment will now be described with reference to figures.

FIGS. 6A, 6B, 6C, 6D, 6E, 6F and 6G show operation waveforms of the embodiment of the motor driving circuit of the present invention. FIG. 6A shows the waveforms of the driving signals PU, PV and PW supplied by the driving signal generating circuit 3 to the pre-driving circuit 4 and to the leakage absorbing circuit 101. FIG. 6B shows the switching states (turned on states and turned off states) of the transistor Q26 of the U-phase leakage current absorbing circuit 111 of the leakage absorbing circuit 101. FIG. 6C shows the switching states (turned on states and turned off states) of the transistor Q36 of the V-phase leakage current absorbing circuit 112 of the leakage absorbing circuit 101. FIG. 6D shows the switching states (turned on states and turned off states) of the transistor Q46 of the W-phase leakage current absorbing circuit 113 of the leakage absorbing circuit 101. FIG. 6E shows the waveform of the driving current IU supplied to the U-phase coil 21. FIG. 6F shows the waveform of the driving current IV supplied to the V-phase coil 22. FIG. 6G shows the waveform of the driving current IW supplied to the W-phase coil 23.

Figure 2:
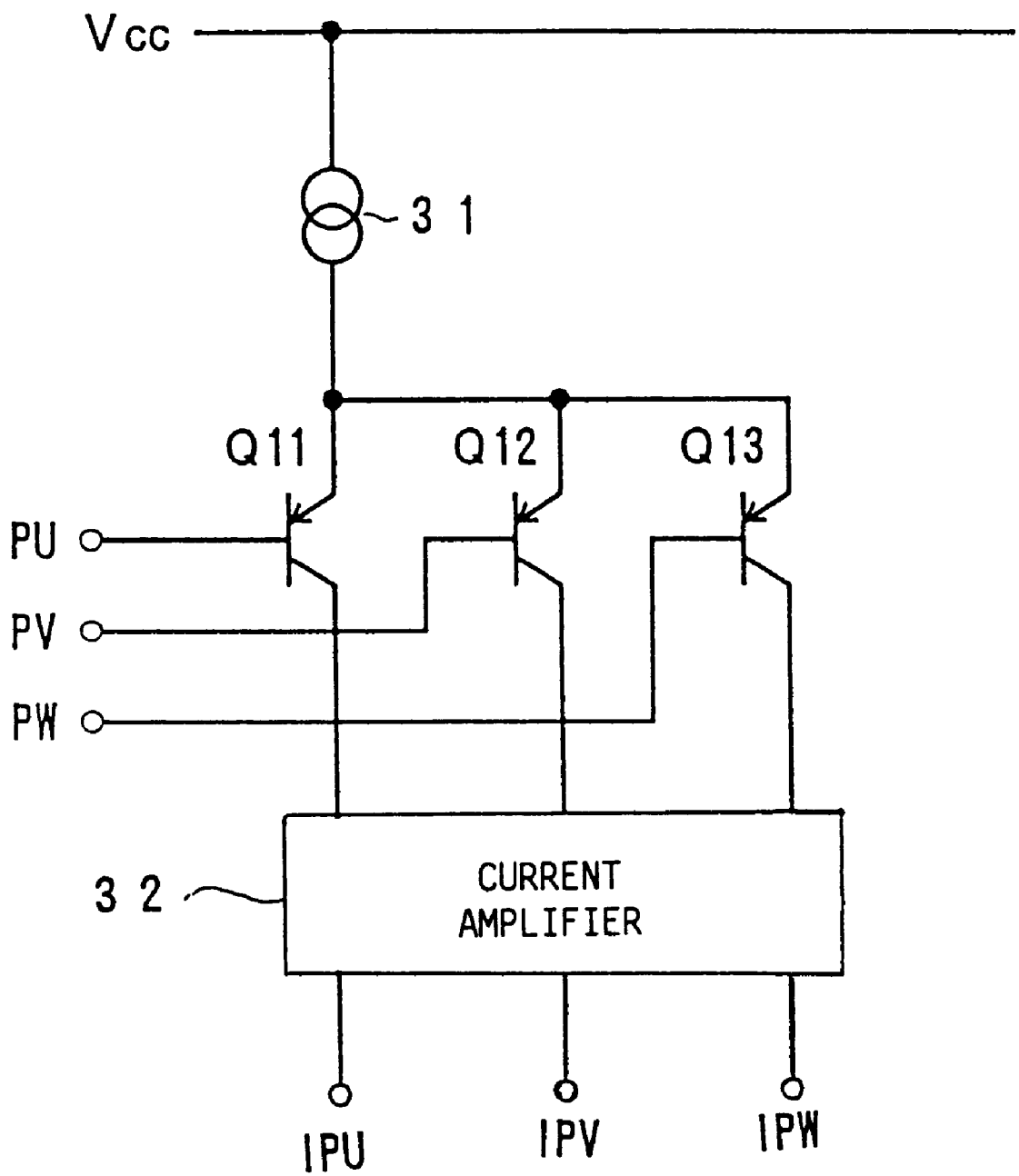
FIG. 2 shows a circuit diagram of a pre-driving circuit of one example of the motor driving circuit in the prior art.

When the voltage of the driving signal PU supplied to the pre-driving circuit 4 and leakage absorbing circuit 101 from the driving signal generating circuit 3 decreases and, as shown in FIG. 6A, the voltage of the driving signal PU is lower than the voltages of the driving signals PV and PW from the time t11, the transistor Q11, to the base of which the driving signal PU is supplied, is turned on, and the transistors Q12 and Q13, to the bases of which the driving signals PV and PW are supplied, respectively are turned off, in the pre-driving circuit 4 shown in FIG. 2. When the transistor Q11 is turned on, the pre-driving current IPU is supplied to the base of the transistor Q1 which is thus turned on. On the other hand, because the transistors Q12 and Q13 are in their turned off states, respectively, the pre-driving currents IPV and IPW are not supplied to the transistor Q2 and Q3, respectively, which are thus turned off.

When the transistor Q1 is turned on and the transistors Q2 and Q3 are turned off, the other end of the U-phase coil 21 is grounded, and, as shown in FIG. 6E, the driving current IU flows through the U-phase coil 21. When the driving current flows through the U-phase coil 21, the magnetic field is generated by the U-phase coil 21. Thereby, the rotor 12 is rotated by the interaction between the magnetic field generated by the U-phase coil 21 and the magnetic field generated by the corresponding portion of the magnet of the rotor 12.

Then, the voltage of the driving signal PU increases and the voltage of the driving signal PV decreases. When the voltage of the driving signal PU is higher than the voltage of the driving signal PV from the time t12, as shown in FIG. 6A, the transistor Q11, to the base of which the driving signal PU is supplied, is turned off, and the transistor Q12, to the base of which the driving signal PV is supplied, is turned on, in the pre-driving circuit 4. When the transistor Q11 is turned off, the supply of the pre-driving current IPU to the transistor Q1 is stopped, and thereby the transistor Q1 is turned off. When the transistor Q1 is turned off, the supply of the driving current IU to the U-phase coil 21 is stopped.

Further, when the transistor Q12 is turned on, the pre-driving current IPV is supplied to the base of the transistor Q2, and thereby, the transistor Q2 is turned on. When the transistor Q2 is turned on, the other end of the V-phase coil 22 is grounded, and thereby, as shown in FIG. 6F, the driving current IV is supplied to the V-phase coil 22. As a result, the rotor 12 is rotated by the interaction between the magnetic field generated by the V-phase coil 22 and the magnetic field generated by the corresponding portion of the magnet of the rotor 12.

Figure 3A:
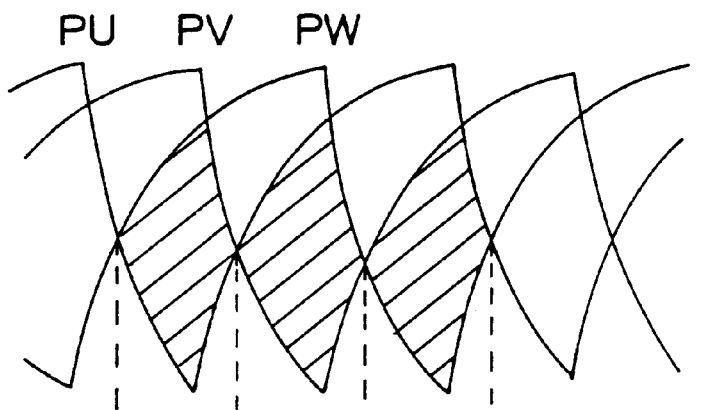
FIGS. 3A, 3B, 3C and 3D show operation waveforms of the motor driving circuit in the prior art.
Figure 3B:
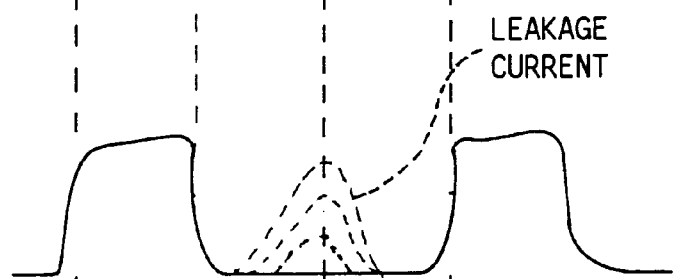
Figure 3C:
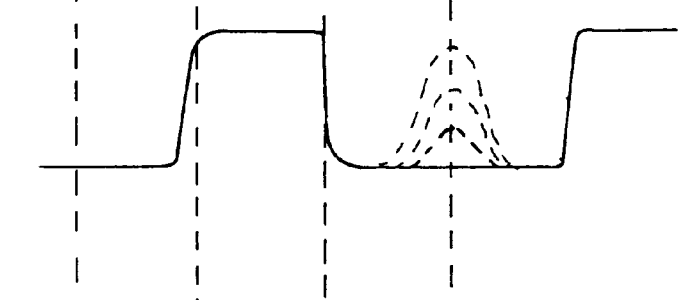
Figure 3D:

Then, the voltage of the driving signal PV increases and the voltage of the driving signal PW decreases. When the voltage of the driving signal PV is higher than the voltage of the driving signal PW from the time t13, as shown in FIG. 3A, the transistor Q12, to the base of which the driving signal PV is supplied, is turned off, and the transistor Q13, to the base of which the driving signal PW is supplied, is turned on, in the pre-driving circuit 4. When the transistor Q12 is turned off, the supply of the pre-driving current IPV to the transistor Q2 is stopped, and thereby the transistor Q2 is turned off. When the transistor Q2 is turned off, the supply of the driving current IV to the V-phase coil 22 is stopped.

Further, when the transistor Q13 is turned on, the pre-driving current IPW is supplied to the base of the transistor Q3, and thereby, the transistor Q3 is turned on. When the transistor Q3 is turned on, the other end of the W-phase coil 23 is grounded, and thereby, as shown in FIG. 6G, the driving current IW is supplied to the W-phase coil 23. As a result, the rotor 12 is rotated by the interaction between the magnetic field generated by the W-phase coil 23 and the magnetic field generated by the corresponding portion of the magnet of the rotor 12.

On the other hand, in the leakage absorbing circuit 101, according to the relationship between the voltages of the driving signals PU, PV and PW supplied from the driving signal generating circuit 3 to the pre-driving circuit 4 and the leakage absorbing circuit 101, the transistors Q26, Q36 and Q46 are turned on, the pre-driving currents IPU, IPV and IPW are caused to flow into the ground, and the transistors Q1, Q2 and Q3 are turned off, in predetermined timings, respectively.

In the U-phase current absorbing circuit 111, as shown in FIG. 6B, during the time period from tc through t14, which time period starts when the voltage of the driving signal PU is higher than the voltages of the driving signals PV and PW and ends when the voltage of the driving signal PU is lower than the voltages of the driving signals PV and PW, the transistor Q23 is turned on and the transistor Q26 is turned on. When the transistor Q26 is turned on, the pre-driving current IPU flows into the ground through the transistor Q26. Thus, it is possible to surely turn off the transistor Q1.

In the V-phase current absorbing circuit 112, as shown in FIG. 6C, during the time period from ta through t12, which time period starts when the voltage of the driving signal PV is higher than the voltages of the driving signals PU and PW and ends when the voltage of the driving signal PV is lower than the voltages of the driving signals PU and PW, the transistor Q33 is turned on and the transistor Q36 is turned on. When the transistor Q36 is turned on, the pre-driving current IPV flows into the ground through the transistor Q36. Thus, it is possible to surely turn off the transistor Q2.

In the W-phase current absorbing circuit 113, as shown in FIG. 6D, during the time period from tb through t13, which time period starts when the voltage of the driving signal PW is higher than the voltages of the driving signals PU and PV and ends when the voltage of the driving signal PW is lower than the voltages of the driving signals PU and PV, the transistor Q43 is turned on and the transistor Q46 is turned on. When the transistor Q46 is turned on, the pre-driving current IPW flows into the ground through the transistor Q46. Thus, it is possible to surely turn off the transistor Q3.

Thus, in the embodiment, the leakage absorbing circuit 101 recognizes the time periods during which the transistors Q1, Q2 and Q3 should be in their turned off states, respectively, using the driving signals PU, PV and PW which are supplied from the driving signal generating circuit 3 to the pre-driving circuit 4. Then, during the time periods during which the transistors Q1, Q2 and Q3 should be in their turned off states, the bases of the transistors Q1, Q2 and Q3 are grounded, respectively. Thereby, it is possible to surely turn off the transistors Q1, Q2 and Q3 in the predetermined timings, respectively. Thus, it is possible to prevent the leakage currents from flowing through the transistors Q1, Q2 and Q3 in the predetermined timings, respectively. As a result, the leakage currents do not flow through the U-phase, V-phase and W-phase coils 21, 22 and 23 during the time periods during which the transistors Q1, Q2 and Q3 should be in their turned off states, respectively. Thereby, the driving efficiency of the motor can be improved, and, as a result of preventing the leakage currents from flowing, the consumed currents can be reduced.

In the embodiment, the leakage absorbing circuit 101 is used together with the leakage current absorbing resistors R1, R2 and R3. However, it is also possible to absorb the leakage currents sufficiently only by the leakage absorbing circuit 101.

Further, the present invention is not limited to the above-described embodiments, and variations and modifications may be made without departing from the scope of the present invention.

What is claimed is:

1. A motor driving circuit for controlling driving currents to be supplied to stator coils of a plurality of phases so as to supply the driving currents to said stator coils in sequence so as to generate a rotating magnetic field, the interaction between the rotating magnetic field generated by said stator coils and a magnetic field generated by a magnet of a rotor causing said rotor to rotate with respect to said stator coils comprising:

driving means for supplying the driving currents to said stator coils, respectively; and preventing means for preventing said driving means from supplying the driving currents to said stator coils in sequence, said preventing means comprising a leakage absorbing circuit for detecting a plurality of time periods during which a plurality of transistors should be in their turned off states, respectively, and turning off said plurality of transistors during said plurality of time periods, respectively.

2. A motor driving circuit for controlling driving currents to be supplied to stator coils of a plurality of phases so as to supply the driving currents to said stator coils in sequence so as to generate a rotating magnetic field, the interaction between the rotating magnetic field generated by said stator coils and a magnetic field generated by a magnet of a rotor causing said rotor to rotate with respect to said stator coils, comprising:

a plurality of driving transistors for supplying the driving currents to said stator coils as a result of each of said plurality of driving transistors being alternatively turned on; and a turning off circuit for forcibly turning off said plurality of driving transistors alternately said turning off circuit comprising:

a leakage absorbing circuit for detecting a plurality of time periods during which said plurality of transistors should be in their turned off states, respectively, and turning off said plurality of transistors during said plurality of time periods, respectively.

3. A motor driving circuit, comprising:

a plurality of transistors for switching supply of driving currents to coils of a plurality of phases in sequence so as to cause said coils to generate a rotating magnetic field;

a driving signal generating circuit for supplying a plurality of driving signals, in accordance with the rotational position of a rotor magnet which is provided rotatably and faces said coils, to a pre-driving circuit;

said pre-driving circuit switching said plurality of transistors by supplying a plurality of pre-driving currents to the bases of said plurality of transistors, respectively, in accordance with the plurality of driving signals, so as to cause said coils to generate the rotating magnetic field; and a leakage absorbing circuit for detecting a plurality of time periods during which said plurality of transistors should be in their turned off states, respectively, and turning off said plurality of transistors during said plurality of time periods, respectively.

4. The motor driving circuit according to claim 3, wherein said leakage absorbing circuit comprises:

comparing means, provided for each of said plurality of transistors, for comparing the level of the driving signal of said plurality of driving signals for the transistor of said comparing means with the levels of the driving signals of said plurality of driving signals for the other transistors; and turning off means for turning off said transistor of said comparing means during the time period starting when the level of the driving signal of said plurality of driving signals for said transistor is higher than any of the levels of the other driving signals of said plurality of driving signals, and ending when the level of the driving signal of said plurality of driving signals for said transistor is lower than any of the levels of the other driving signals of said plurality of driving signals.

* * * * *